United States Patent
Wagner

[11] 3,944,769
[45] Mar. 16, 1976

[54] PRESSURE SENSING MEANS AND METHOD FOR MAKING A PRESSURIZED CONTAINER MEANS AND SYSTEM UTILIZING THE SAME

[75] Inventor: Joseph P. Wagner, Knoxville, Tenn.
[73] Assignee: Robertshaw Controls Company, Richmond, Va.
[22] Filed: Sept. 25, 1974
[21] Appl. No.: 509,009

Related U.S. Application Data

[63] Continuation of Ser. No. 321,648, Jan. 8, 1973, abandoned.

[52] U.S. Cl. ............... 200/83 A; 73/393; 200/83 B; 200/83 N; 280/150 AB; 340/242
[51] Int. Cl.² .......................................... H01H 35/34
[58] Field of Search ... 280/150 AB; 200/83 J, 83 N, 200/83 A, 83 B, 83 R, 61.25, 61.26; 340/242; 73/393, 407 R

[56] References Cited
UNITED STATES PATENTS

| | | | |
|---|---|---|---|
| 1,665,381 | 4/1928 | Siddal | 200/83 N |
| 2,439,561 | 4/1948 | Cressey | 200/83 J X |
| 2,839,630 | 6/1958 | Wood | 200/83 C |
| 3,246,093 | 4/1966 | Boettinger | 200/83 N |
| 3,302,269 | 2/1967 | Cooper | 200/83 B |
| 3,359,388 | 12/1967 | Houser | 200/83 B |
| 3,723,684 | 3/1973 | Greenwood | 200/83 R |
| 3,728,899 | 4/1973 | Dijkema | 73/393 |
| 3,735,376 | 5/1973 | Kermer | 200/83 R |
| 3,818,764 | 6/1974 | Wagner | 280/150 AB |

*Primary Examiner*—M. H. Wood, Jr.
*Assistant Examiner*—John P. Silverstrim
*Attorney, Agent, or Firm*—Candor, Candor & Tassone

[57] ABSTRACT

A pressure sensing means having a housing provided with a chamber therein. A double wall fluid operated device is disposed in the chamber of the housing and is carried by the same, the walls of the device defining a chamber therebetween that is interconnected to the exterior of the housing by a passage. A charge of pressure fluid is sealed in the chamber of the housing to initially hold the walls of the device in flat abutting relation in a manner to prevent an adverse permanent set thereof. Subsequently, the chamber of the double wall fluid operated device is interconnected to the pressurized chamber of a container means for a vehicular air bag safety system whereby the pressure sensing means can subsequently detect loss or gain of pressure differential across at least one of the walls of the double wall operated device for detection purposes or the like.

3 Claims, 6 Drawing Figures

PRESSURE SENSING MEANS AND METHOD FOR MAKING A PRESSURIZED CONTAINER MEANS AND SYSTEM UTILIZING THE SAME

This is a continuation of application Ser. No. 321,648, filed Jan. 8, 1973, now abandoned.

This invention relates to an improved pressure sensing device and to a method for making such a pressure sensing device as well as to a pressurized container means and method for making the same.

It is well known that a vehicular air bag safety system has now been provided wherein an inflatable bag is normally disposed in a flat, out of the way condition and is adapted to be almost instantaneously inflated by fluid pressure upon an impact of a vehicle with a harm producing object so as to protect one or more individuals in the vehicle being engaged by the thus inflated bag. In order to inflate such safety air bag, a container means must be provided for the storing of such inflating fluid under pressure and in order for the system to function properly, the pressure in such container means must not increase or decrease beyond a predetermined amount when that container means is at a certain temperature.

For example, such fluid storage container means can each be charged with an inert gas, such as argon, helium, and the like, or a mixture of the same, to approximately 2400 psi at room temperature and such container means must be adapted to maintain the stored gas pressure so that the same does not drop by more than approximately 200 psi or does not gain more than approximately 200 psi when at that same room temperature. Of course, such limits, as well as others hereinafter set forth, are by way of example only and are not intended in any manner to place restrictions on the scope of the claimed invention.

It is feature of applicant's concurrently filed patent application, Ser. No. 322,071, filed Jan. 8, 1973, now U.S. Pat. No. 3,818,764 and entitled PRESSURE SENSING MEANS AND METHOD FOR A PRESSURIZED CONTAINER MEANS AND SYSTEM UTILIZING THE SAME, to provide a means for detecting any adverse loss or gain in the pressure in such pressurized container means caused by means other than temperature change, such as pressure changes that are caused by a leak in the container means or other damage of the container means.

In particular, one embodiment of the invention of the aforementioned pending patent application comprises a fluid operated sensing means carried by the container means in such a manner that the sensing means is substantially surrounded by a reference pressure of the fluid of the container means so as to be temperature compensated thereby whereby any pressure changes of the fluid in the container means caused by temperature changes thereof are ineffective to cause a sensing thereof by the sensing means as the fluid of the sensing means is always at the same temperature as the fluid in the container means. Such sensing means comprises a fluid operated means having a movable wall inside the container means with that movable wall being changed by the pressure differential acting across the same and operating an electrical switch of a signal means to indicate when the pressure in the container means has changed from the desired value thereof to an undesired value thereof by means other than temperature change thereof.

Thus, under extreme temperature variation conditions of the storage area for the fluid storage container for the vehicle air bag safety system, even though the same is inside the passenger compartment, the temperature of the fluid in the container means can reach approximately 220° F or minus 20° F and under these abient temperature conditions, the pressure within the container means can build to 3400 psi or go as low as 1700 psi at the extreme temperature conditions thereof even though the same is approximately 2400 psi at room temperature. However, the sensing device of the aforementioned copending application is temperature compensated by the fluid of the container itself, so that the temperature of the fluid operated sensing device is the same as the temperature of the fluid in the container means. Thus, such pressure changes caused by extreme temperature conditions will not cause a false indication that the pressure within the container means has been adversely affected by means other than temperature.

The aforementioned copending patent application teaches that the fluid in the sensing means must initially be at the same pressure level as the pressure level of the fluid initially charged into the main container means and, such copending patent application states that the sensing means and the container means can be simultaneously charged with the same fluid and to the same pressure level.

However, it has been found according to the teachings of this invention that it may be desirable to charge the sensing means with the its fluid remote from the main container means so that such percharged sensing means can thereafter be assembled inside the container means for the previously mentioned temperature compensating purposes with the container means subsequently being charged with its fluid independently of the precharging of the sensing means and still have the sensing means perform its function of thereafter detecting any loss in the pressure in the main container means caused by a leak of fluid from the main container means or other damage thereof as will be apparent hereinafter.

Accordingly, it is a feature of this invention to provide an improved pressure sensing means that can be precharged with its pressure fluid and which will not be adversely affected thereby, such as by being given an adverse permanent set by such percharging thereof, so that the same can thereafter be utilized with a pressurized container means to sense pressure changes therein.

In particular, one embodiment of this invention provides a sensing means having a housing means provided with a chamber therein. A double wall fluid operated device is disposed in the chamber of the housing means and is carried by the same, the walls of the device defining a chamber therebetween that is interconnected to the exterior of the housing means by a passage means. A charge of pressure fluid is sealed in the chamber of the housing means and since the chamber of the double wall fluid operated device in an atmospheric condition, the pressure of the fluid in the chamber of the housing means holds the walls of the device in a collapsed abutting condition. Since both walls are moved toward each other by the surrounding fluid pressure in the chamber of the housing means so as to be held in intimate contact against each other, no adverse permanent set is provided on the walls of the fluid operated device even though the percharged sensing means is stored for a relatively long period of time. Such sensing means can thereafter be assembled inside the container means of a vehicular air bag safety system and the container means can be subsequently charged with pressure fluid to the desired level thereof which, according to the teachings of this invention, is to substantially the same pressure level as the pressure level of the precharged fluid that is sealed in the chamber of the housing means of the sensing means whereby the chamber inside the fluid operated device is now interconnected to the fluid pressure in the main container means and will cause the movable walls thereof to expand outwardly to a certain position because of the resulting pressure differential now acting across such walls.

When the pressure differential across the walls of the sensing means is at an acceptable level, one of the walls of the fluid operating device can be utilized to make contact with a contact means so as to continuously indicate that the pressure level within the main container means is at an acceptable level. However, should the pressure differential acting across such wall of the fluid operated device increase because of a loss of fluid pressure in the main container means, such as through a leak thereof or the like, such movable wall will move away from the contact means by such resulting increase in pressure differential across the same and thereby interrupt an electrical circuit so that an indicator or alarm will be activated to provide means for indicating that the pressure level within the main container means has fallen below an acceptable level for safe operation of the vehicular air bag safety system.

Therefore, it is an object of this invention to provide an improved pressure sensing means having one or more of the novel features of this invention as set forth above or hereinafter shown in described.

Another object of this invention is to provide a method for making such a fluid operated pressure sensing means.

Another object of this invention is to provide an improved pressurized container means for a vehicular air bag safety system and the like.

Another object of this invention is to provide a method for making such a pressurized container means or the like.

Other objects, uses and advantages of this invention are apparent from the reading of this description which proceeds with reference to the accompanying drawings showing a part thereof and wherein.

Figure 2:
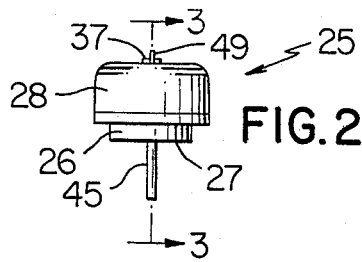
FIG. 2 is a side view of the improved fluid operated pressure sensing means of this invention.

While the various features of this invention are hereinafter described and illustrated as being particularly adaptable for providing pressure sensing means for the pressurized container means of a vehicular air bag safety means, it is to be understood that the various features of this invention can be utilized singularly or in any combination thereof to provide fluid operated sensing means for other devices as desired.

Therefore, this invention is not to be limited to only the embodiment illustrated in the drawings, because the drawings are merely utilized to illustrate one of the wide variety of the uses of this invention.

Figure 1:
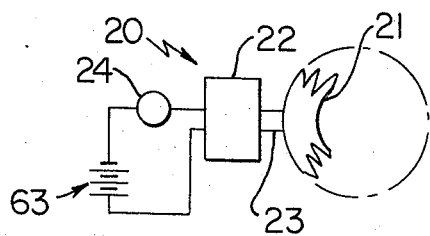
FIG. 1 is a schematic view illustrating the vehicular air bag safety system of this invention.

Referring now to FIG. 1, a vehicular air bag safety system is generally indicated by the reference numeral 20 and comprises an air bag structure 21 adapted to be normally stored in a collapsed out of the way condition but being adapted to be substantially instantaneously inflated as schematically illustrated in FIG. 1 by being fluidly interconnected to a pressurized container means 22 by suitable means 23 that is actuated by an impact of the vehicle against a harm producing object in a manner well known in the art whereby the details of the same need not be further described in order to understand the features of this invention.

The system 20 of this invention includes a signal producing device 24, such as an alarm, lamp, or other indicator which will be activated by the pressure sensing means of this invention in a manner later to be described when the pressure sensing means detects an adverse change in the pressure of the fluid in the storage container means 22.

Figure 3:
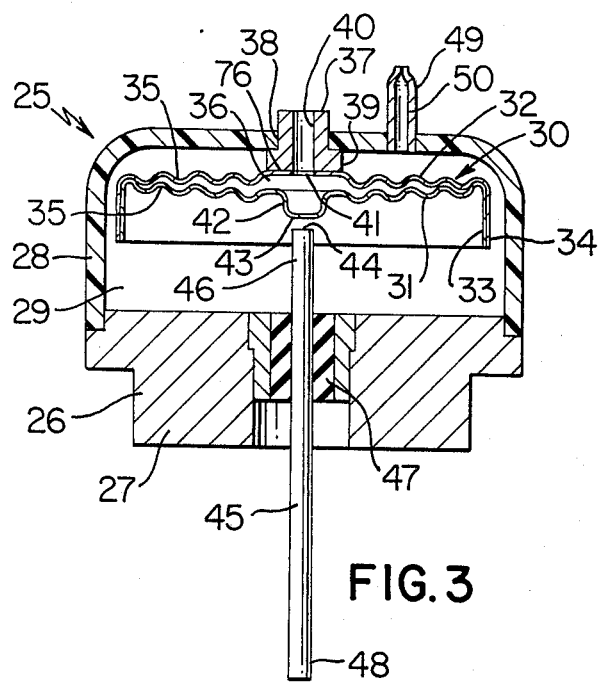
FIG. 3 is an enlarged, cross-sectional view taken substantially on line 3—3 of FIG. 2, FIG. 3 illustrating the fluid operated pressure sensing means before the same has been charged with its fluid.

As illustrated in FIGS. 2 and 3, the pressure sensing means of this invention is generally indicated by the reference numeral 25 and comprises a housing means 26 that can be formed from a pair of parts 27 and 28 assembled together to provide a chamber 29 therebetween and within the housing means 26. While the housing part 28 is illustrated as being formed of electrically insulating material, it is to be understood that the same could be formed of electrically conductive material if desired as will be apparent hereinafter.

A double wall fluid operated device that is generally indicated by the reference numeral 30 is disposed within the chamber 29 of the housing means 26 and is carried by the same, the device 30 comprising a pair of annular cup-shaped diaphragm walls 31 and 32 respectively being secured together at their outer peripheries 33 and 34 in a manner well known in the art and being adapted to define a chamber 36 therebetween.

The walls 31 and 32 are respectively corrugated by a plurality of annular flutes 35 which are adapted to intimately and readily nest within one another in the manner illustrated in FIG. 4 for a purpose hereinafter described.

The wall 32 of the device 30 has its central portion 76 secured to a tubular member 37 sealed through an opening 38 in the housing part 28 whereby the tubular member 37 carries the double wall device 30 and since the tubular member 37 is secured to the housing means 28 and has an enlarged annular part 39 disposed within the chamber 29 so that the same cannot pass through the opening 38 in the housing part 28, the tubular part 37 secures the device 30 to the housing means 26 within the chamber 29 thereof. The tubular member 37 has a passage 40 passing longitudinally therethrough and being aligned with an opening 41 formed through the central part 76 of the wall 32 so that the passage 40 is in fluid communication with the chamber 36 of the device 30 and, thus, fluidly interconnects the chamber 36 of the device 30 to the exterior of the housing means 26 for a purpose hereinafter described.

Figure 5:
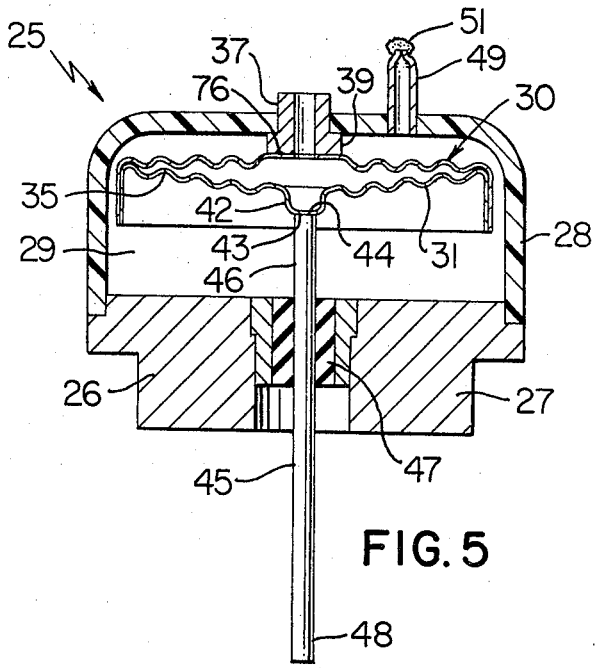
FIG. 5 is a view similar to FIG. 4 and illustrates the fluid operated pressure sensing means of this invention after the same has been disposed within a main container means that has also been subsequently charged with its pressure fluid.

The other wall 31 of the device 30 has its central portion 42 formed in a cup shape to provide a flat circular part 43 extending completely beyond the flutes 35 of the wall 31 so as to be adapted to abut against a flat end 44 of a terminal rod 45 having its upper end 46 projecting into the chamber 29 of the sensing means 25 in the manner illustrated in FIG. 5 for the purpose hereinafter described.

The terminal rod 45 is secured to the housing part 27 while being electrically insulated therefrom by an electrically insulating sleeve 47 so that the upper end 46 of the rod 45 projects into the chamber 29 and the lower end 48 thereof projects out of the housing means 26 for lead attachment purposes as will be apparent hereinafter.

The terminal rod 45 is assembled to the housing means 26 in such a manner that the upper surface 44 of the upper end 46 of the rod 45 is slightly spaced from the surface 43 of the wall 31 of the device 30 when the chamber 29 of the housing means 26 and the chamber 36 of the device 30 are at atmospheric conditions as illustrated in FIG. 3 for a purpose hereinafter described.

The housing part 28 carries a fill tube 49 that has its passage means 50 in fluid communication with the chamber 29 of the housing means 26.

After the pressure sensing means has been assembled in the manner illustrated in FIG. 3, the chamber 29 thereof is adapted to be precharged with pressure fluid and to a pressure level that is substantially the same as the desired pressure level that is to be maintained in the main container means 22 of the air bag safety system 20. It is preferred that the fluid being charged into the chamber 29 of the sensing means 25 through the fill tube 49 be of the same type of fluid that is to be utilized in the main container means 22. In any event, after the chamber 29 has been charged to the predetermined pressure level thereof, the fill tube 49 is sealed closed by any suitable means, such as by the welding 51 illustrated in FIG. 4 whereby the charge of pressure fluid within the chamber 29 is completely sealed from the exterior of the housing means 26.

Figure 4:
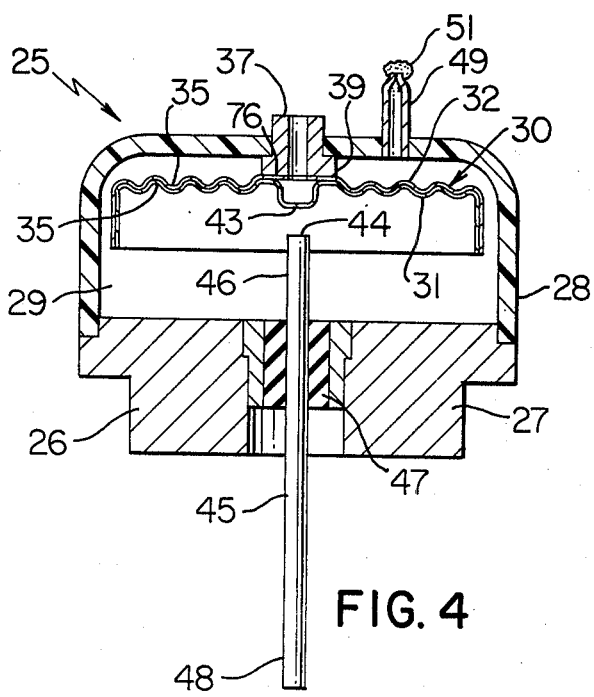
FIG. 4 is a view similar to FIG. 3 and illustrates the fluid operated pressure sensing means after the same has been precharged with its fluid.

Since the chamber 29 of the device 30 is at atmospheric condition, it can be seen that as the pressure fluid is being charged into the chamber 29, the resulting pressure differential acting across the walls 31 and 32 of the device 30 causes the walls 31 and 32 to collapse toward each other as illustrated in FIG. 4 and have the flutes 35 thereof intimately fit within each other so that both walls 31 and 32 are pushing toward each other with the same force. Thus, neither wall 31 or 32 is overstressed by the charged pressure fluid within the chamber 29 and therefore will not take any adverse permanent set from the fluid pressure charge in the chamber 29 even though the charged device 25 may remain in a stored and precharged condition for a relatively long period of time before the same is utilized with the container means 22 for the air bag safety system 20.

Figure 6:
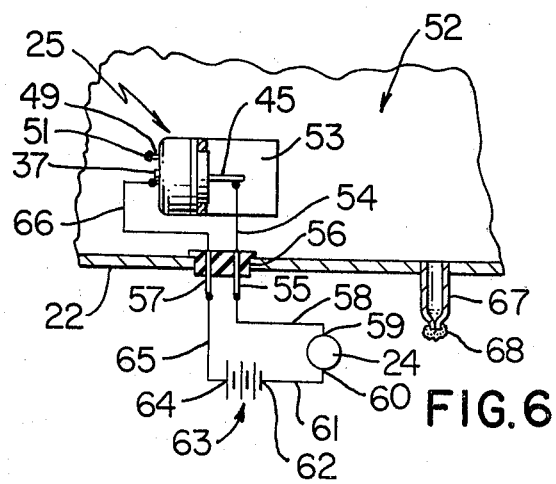
FIG. 6 is a fragmentary schematic view illustrating how the pressure sensing means of this invention can be mounted within the main container means and can be utilized to indicate loss of pressure therein.

The precharged sensing means 25 of this invention is adapted to be disposed within the main chamber 52 of the container means 22 in the manner illustrated in FIG. 6 and can be supported therein by suitable bracket means 53. The terminal rod 45 of the device 25 could be electrically interconnected by a lead 54 to a terminal 55 that projects out of the container means 22 and is electrically insulated therefrom by an electrically insulating plug 56 which also carries another terminal 57 in electrically spaced relation to the terminal 55. The terminal 55 is adapted to be interconnected by a lead 58 to one side 59 of the indicating device 24 while the other side 60 thereof is adapted to be interconnected by a lead 61 to one side 62 of an electrical power source 63, such as the automobile battery that is illustrated. The other side 64 of the electrical power source 63 is adapted to be interconnected by the lead 65 to the terminal 57. The terminal 57, in turn, is adapted to be interconnected by the lead 66 to the tubular member 37 of the sensing device 30 whereby the side 64 of the power source 63 is, in effect, electrically interconnected to the wall 31 of the device 30 while the terminal rod 45 is electrically interconnected to the other side 62 of the power source 63.

The indicator 24 is so constructed and arranged that the same indicates that the system is safe as long as an electrical current passes therethrough so that when the electrical current passing through the indicator 24 is broken, the same indicates that an unsafe condition exists such as by flashing a light, sounding an alarm, etc.

After the precharged device 25 of this invention is assembled in the chamber 52 of the container means 22 in the manner illustrated in FIG. 6, the chamber 52 of the container means 22 can be charged with its pressurized fluid through a filling tube 67, FIG. 6, to the predetermined pressure level thereof. When the pressure level within the chamber 52 reaches substantially the same pressure level as within the chamber 29 of the sensing device 30 of the sensing means 25, the chamber 36 of the device 30 within the chamber 29 of the housing means 26 is now receiving pressure fluid that is in the chamber 52 of the container means 22 and has caused the pressure differential across the walls 31 and 32 of the device 30 to decrease so that when the chamber 52 is charged to a pressure level only slightly above the pressure level in the chamber 29 of the sensing device 25, the movable wall 31 is moved by the pressure differential across the same in such a manner that the flat part 43 thereof makes electrical contact with the end surface 44 of the terminal rod 45 in the manner illustrated in FIG. 5 to thereby effectively complete the electrical circuit through the indicator 24. Thus, the indicator 24 will indicate that the container means 22 is charged to the proper pressure level and that as long as the pressure in the chamber 52 of the container means 22 remains at such pressure level and does not fall below the same by approximately 200 psi or other pre-selected amount, the indicator 24 will have the electrical circuit completed therethrough by the sensing means 25 in a manner illustrated in FIG. 5. Thus, the fill tube 67 can be sealed closed by the sealing means 68 illustrated in FIG. 6 and the container means 22 can now be utilized in the vehicular air bag safety system 20 of FIG. 1.

When the charged container means 22 is utilized in the vehicular air bag safety system 20 as illustrated in FIG. 1, the indicator 24 will continuously indicate that the pressure level within the container means 22 is at the proper pressure level for safe operation of the air bag 21.

However, should the pressure within the chamber 52 of the container means 22 fall approximately 200 psi below the initial charge value thereof, the resulting pressure differential acting across the wall 31 of the device 30 of the sensing means 25 will cause the wall 31 to have the central part 43 thereof move away from the end 44 of the terminal rod 45 and thereby break the electrical circuit therebetween and, thus, break the electrical circuit through the indicator 24 so that the indicator 24 will provide its warning function to the operator of the vehicle that the container means 22 for the air bag safety means 20 is in a damaged condition so that the same will not operate the air bag 21 in the proper manner and must be immediately checked.

If desired, the terminal 57 can be eliminated and the side 64 of the power source could be connected to ground while the housing part 28 of the sensing means 25 could be formed of conductive material and be effectively interconnected to ground through the bracket 53 and container means 22. Thus, in order for an electrical circuit to be completed through the indicator 24, the wall 31 of the device 30 must make contact with the terminal rod 45.

Therefore, it can be seen that this invention provides an improved fluid operated pressure sensing means that can have the fluid thereof precharged therein and such precharging of the pressure fluid therein will not cause the movable wall means thereof to take an adverse permanent set, the pressure sensing means of this invention being adapted to be disposed within a main container means that is to be subsequently pressurized so that the same will be temperature compensated by the fluid pressure within the main container means for the reasons fully set forth in the aforementioned co-pending patent application.

It can also be seen that this invention provides a method for making such a fluid operated sensing means as well as an improved pressurized container means and method of making the same.

While the form and method of the invention now preferred have been disclosed and described as required by Patent Statutes, it is to be understood that other forms and methods can be utilized and still come within the scope of the appended claims.

What is claimed is:

1. In combination, a container means having a pressurized fluid therein, and fluid operated sensing means carried by said container means for sensing pressure changes within said container means, said sensing means and said container means being so constructed and arranged that said sensing means is temperature compensated by being disposed within said container means to be substantially surrounded by a reference pressure of said fluid of said container means so that pressure changes of said fluid in said container means caused by temperature changes thereof are ineffective to cause sensing thereof by said sensing means as the fluid of said sensing means is at the same temperature as said fluid in said container means, said fluid operated sensing means and said container means having been initially charged with their respective pressurized fluids to substantially the same pressure levels, said sensing means comprising a housing means secured in said container and having a chamber therein, a double wall fluid operated device disposed in said chamber of said housing means and being carried by the same, said walls of said device defining a chamber therebetween, said device having passage means interconnecting said chamber of said device to the exterior of said housing means so as to be in fluid communication with said fluid in said container means, and a charge of pressure fluid sealed in said chamber of said housing means to provide said pressurized fluid of said sensing means, said charge of fluid in said chamber of said housing means being adapted to hold said walls of said device in intimate contact with each other throughout the entire effective surface areas thereof so that the same will not take a permanent set when the chamber therebetween is at atmospheric conditions.

2. A combination as set forth in claim 1 wherein a contact means is carried by said housing means and is disposed within said chamber of said housing means, said device and said contact means being so constructed and arranged that one of said walls makes contact with said contact means as long as the pressure value of the fluid in said chamber of said device is substantially the same as the pressure value of the fluid sealed in said chamber of said housing means.

3. A combination as set forth in claim 2 wherein said contact means comprises a terminal rod insulated from said housing means and having one end thereof disposed in said chamber to be contacted by said one wall of said device and having the other end thereof projecting out of said housing means for exterior lead attachment thereto.

* * * * *